May 15, 1962  E. RUGGIERI  3,034,305
PORTABLE REFRIGERATING UNIT
Filed Aug. 16, 1960  2 Sheets-Sheet 1
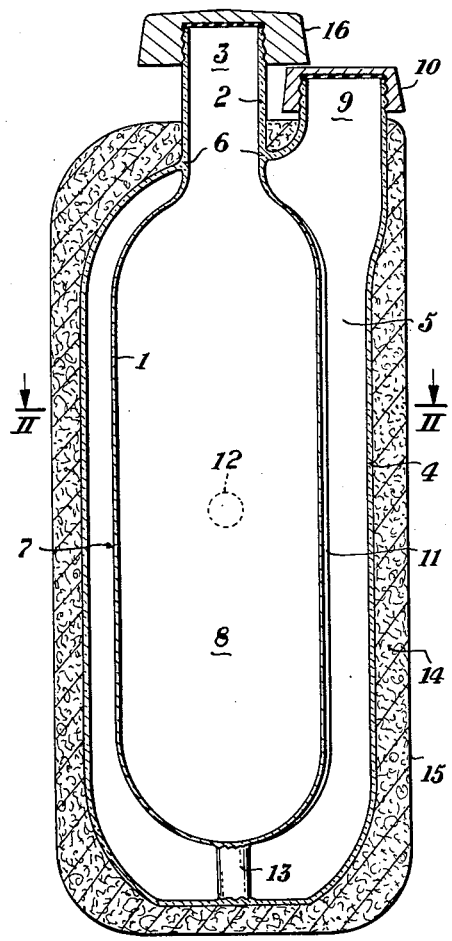
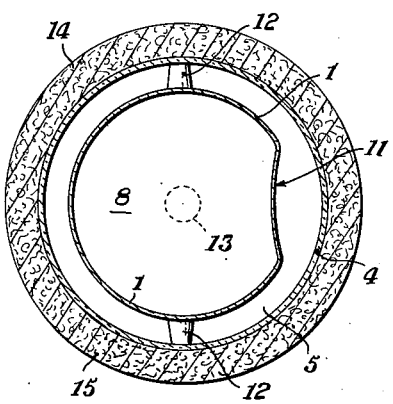
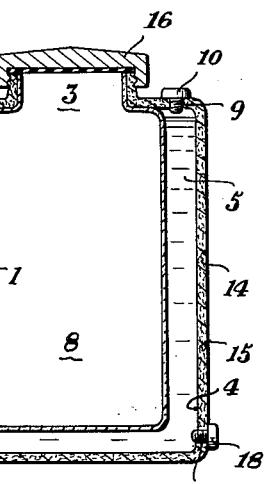
INVENTOR.
Egidio Ruggieri
Wenderoth, Lind & Ponack
Attys.

May 15, 1962  E. RUGGIERI  3,034,305
PORTABLE REFRIGERATING UNIT
Filed Aug. 16, 1960  2 Sheets-Sheet 2

INVENTOR.
Egidio Ruggieri
BY
Wenderoth, Lind & Ponack
Attys.

United States Patent Office 3,034,305
Patented May 15, 1962

3,034,305
PORTABLE REFRIGERATING UNIT
Egidio Ruggieri, Rome, Italy, assignor to Adir-Apparecchi di Raffreddamento S.r.l., Rome, Italy, a corporation of Italy
Filed Aug. 16, 1960, Ser. No. 49,980
Claims priority, application Italy Sept. 24, 1959
5 Claims. (Cl. 62—4)

The present invention relates to a portable refrigerating container or unit particularly but not exclusively suitable for refrigerating and preserving drinkable liquids and foodstuffs generally, the operation of this refrigerating unit depending upon the use of frigorific mixtures.

More particularly, the present invention relates to a portable refrigerating container capable of refrigerating and/or preserving in fresh condition liquid and solid products, said container comprising a thermally insulating casing enclosing at least one cell (having any shape) suitable to contain a frigorific substance and at least one cell (having any shape) suitable to contain the material to be refrigerated and/or preserved at a temperature lower than that of the surrounding ambient the inner spaces of the two cells (or of the two groups of cells) being separated only by a heat conducting wall, and each container being provided with an aperture with a closure member; the frigorific substance consisting of a frigorific mixture, i.e. water and one or more chemical compounds selected from the group of salts which when dissolving in water cause its temperature to be lowered.

It is known that certain salts or mixtures of salts, when dissolved in water cause the temperature of the solution to be lowered; said lowering of the temperature depends essentially upon the particular type of salts or mixture of salts which is being used and final temperatures of −10 to −20° C. and lower can be attained. The frigorific-mixtures may consist of various substances suitable to cause, when contacted with the water a great lowering of the temperature. Good results have been obtained by the use of mixtures having the formulation as follows: ammonium nitrate + ammonium chloride; potassium nitrate + sodium nitrate + ammonium nitrate; potassium nitrate + ammonium chloride; potassium sulphocyanate; calcium chloride.

Practically, according to the present invention, unexpected best results have been attained by a mixture consisting of ammonium nitrate, ammonium chloride, potassium nitrate and sodium sulphate. The formulation of said mixture according to which the best results have been obtained is as follows:

For 50 parts of water: Parts by weight
$NH_4NO_3$ _____ 30–40
$NH_4Cl$ _____ 10–20
$KNO_3$ _____ 5–15
$Na_2SO_4$ _____ 20–30

Particularly it has been found that the best result is obtained by a mixture consisting of 35 parts $NH_4NO_3$, 15 parts $NH_4Cl$, 10 parts $KNO_3$ and 25 parts $Na_2SO_4$, for 50 parts water.

The component salts of the frigorific mixture are preferably prepared within small envelopes, in the preferred dosages for the best refrigerating effect. The sodium sulphate which due to its high deliquescence would tend to form lumps of the salt mixture, rendering difficult the use thereof, is prepared according to the present invention preferably in separate envelopes mixed with starch. It has been found, in fact that the addition of 4–5% starch to the sodium sulphate prevents the latter from agglomerating and allows the sodium sulphate to be preserved for a long time in loose state.

One embodiment of the present invention, affording particular storage, shipping and use advantages, consists of sealed envelopes of neutral, water-proof and strong, preferably transparent material (for instance a plastic material) with two compartments, one of which contains the salt or the salt mixture, and the other the water for dissolving said salts in the desired dosages and proportions. It is also possible to interpose between said two compartments of the envelope a partition having a mechanical strength lesser than that of the outer envelope, so that when the water compartment is manually squeezed, said partition will be broken and the salts contact the water causing the temperature to be lowered. In this case the envelope may become a refrigerating element which can be located, as such, in the suitable cell of the portable refrigerating unit or untilized in any container in order to refrigerate a liquid therein contained. This double envelope can be used, by causing the products therein contained to outflow one after the other, to charge the suitable cell of the portable refrigerating unit according to this invention.

Obviously the cooling effects of the frigorific mixture will have a duration limited to a certain time period and thus it will be necessary, when the mixture is exhausted, to add thereto further increments of the product suitable to cause a further cooling action. However, it has been found that for reactivating this mixture not all of the products already utilized need to be added thereto, but only one or some of them. This is due to the fact that in order to obtain the desired lowering of the temperature, it has been necessary to use first all of the products of the mixture, and subsequently in order to keep the mixture at the reached temperature the solution effect of some or only one of the products utilized for forming said mixture will be sufficient.

This invention will be hereinafter described, by way of example, with reference to the attached drawings, wherein:

FIG. 1 is vertical cross-sectional view of a portable refrigerating unit according to this invention;

FIG. 2 is a horizontal cross-sectional view of the refrigerating unit of FIG. 1 taken along the plane II—II;

FIG. 3 is a vertical, cross-sectional view of a modification of the refrigerating unit according to FIGS. 1 and 2;

Figure 5:
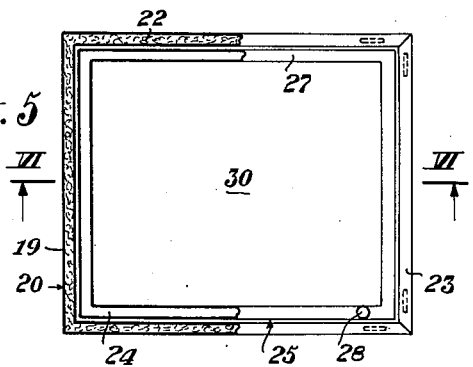
FIG. 5 is a top plane view of the refrigerating unit of FIG. 4, with the cover removed.

With reference to FIGS. 1 and 2, the refrigerating container consists of an inner cell or bottle 1, substantially cylindrical suitable to contain in its inner space the substances to be refrigerated and provided with a neck 2 open at its top, forming the mouth 3 of the container. This inner cell or bottle is enclosed within another container or cell 4, having also a substantially cylindrical shape and a greater diameter, so that between said containers a space 5 is created forming the inner space of the cell 4. In register with the base of the neck 2, said two containers are rigidly and sealingly connected to one another, for instance welded at 6. The connection between the outer container 4 and the inner container 1 is so embodied that the frigorific liquid, contained within said space 5, can entirely outflow from the refrigerating unit when the latter is tilted, avoiding thus the presence, within the cell 4, of residues of the depleted solution which would diminish the refrigerating effect of any fresh mixture introduced into said space.

The wall 7 of the cell 1 is embodied with such a material that, with the practically used thickness, said wall allows a sufficiently quick heat transmission between the inner spaces 5 and 8 of the cells 1 and 4.

Near to the upper portion of the outer container 4 an inlet 9 is provided, communicating with the space 5, and through said inlet, which is provided with a closure plug 10, the frigorific mixture and the water are introduced into the cell 4.

In register with the mouth 9 of the space destined to contain the frigorific solution, the inner container 1 is provided with a groove 11 creating within said space a passage having a greater cross-sectional area, in order to render easy the inlet of the solid salts into the refrigerating unit.

Between the walls of the cells 1 and 4, the spacers 12 and 13 may be arranged for mechanical purposes.

The container, embodied as above described, is coated with an insulating outer coating 14 in turn enclosed, if the case may be, by a casing 15 made of a suitable material, for instance metal, plastic material and so on.

The mouths 3 and 9 of the container for the product to be refrigerated and for the container of the frigorific solution, respectively, are so located that their associated closure members 16 and 10 are partially overlapping, so that it will be impossible to remove the closure from the container for the frigorific solution, if the closure of the container for the products to be refrigerated has not been previously removed; thus the risk that, due to a mistake, the frigorific solution be poured instead of the drinkable refrigerated liquid, is entirely avoided.

FIG. 3 shows a diagrammatical cross-sectional view, taken along a vertical plane, of a refrigerating unit having a box-like shape; the various parts of the refrigerating unit have been denoted by the same numeral references used in FIG. 1. This refrigerating unit can also be used for stationary or movable plants. In this case, in the lower portion of the space preferably an aperture 17 with a plug 18 is provided for discharging the mixture contained within said space, when necessary. In this embodiment, instead of a single aperture 9, communicating with the space 5, two or more apertures may be provided, each having its closure plug 10.

Figure 4:
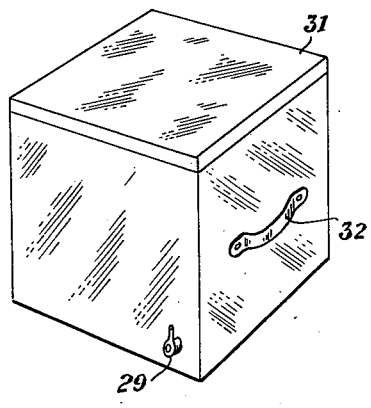
FIG. 4 is a perspective view of another embodiment of the refrigerating unit according to this invention.
Figure 6:
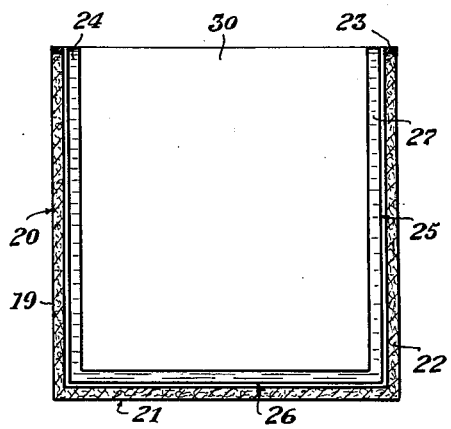
FIG. 6 is a vertical cross-sectional view taken along the line VI—VI of the refrigerating unit of FIG. 4.

With reference to FIGS. 4, 5 and 6, the refrigerating unit consists of a parallelepiped shaped container 19, open at its top surface, the side faces 20 of which, and preferably also the bottom 21 are double walled, so that in said walls a space is provided and filled with an insulating matter 22 of whatever type.

This space filled with the insulating material is closed at its top by a frame 23 made of wood or any other bad heat conductive material, in order to interrupt the continuity of the material for the passage of heat from the outer wall to the inner wall of the outer protective container.

Inside this container another container 24 is arranged, having a shape similar to that of the container 19, upwards open and the side faces 25, and preferably also the bottom 26 of which are double walled. The faces or walls 25 are closed at their upper end, so that the casing is provided with an enclosed space 27 into which the frigorific mixture and the water are introduced through a suitable aperture 28 provided in the upper portion and which can be closed by any plug.

This container can be defined by the sole lateral spaces, at the four side walls, without the bottom.

In the space where the frigorific solution is contained, a stirrer operated from outside can be provided, to obtain a more active mixing of the mixture, in order to facilitate the solution of the salts.

If desired, particularly when the refrigerating unit has a great size, or it is utilized for stationary plants, a hole can be provided in the lower portion of the enclosed space, to communicate with the outside of the refrigerating unit, and capable of being closed by a cock 29, for discharging the mixture contained within said space when necessary. Inside the container 24 is located the receptacle 30 for the substances to be refrigerated, and the shape of this receptacle is preferably equal to that of the container 24.

The top portion of the refrigerating unit is closed by a cover 31 which is also suitably protected with an insulating matter. In the illustrated example the refrigerating box is provided with handles 32 for its transportation.

Figure 7:
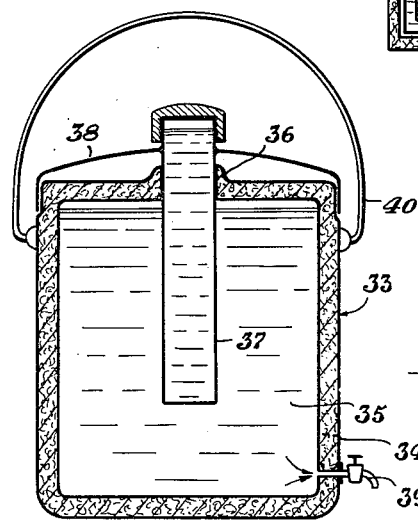
FIG. 7 is a vertical cross-sectional view of another embodiment of this invention.

With reference to FIG. 7 the portable refrigerating unit according to this invention consists of a bucket 33 coated or formed with an insulating matter 34 and destined to contain the substances 35 to be refrigerated. In the top wall an aperture 36 is provided into which a container 37 for the frigorific solution is sealingly inserted said container being rigid with the cover 38 of the bucket 33. The refrigerating unit may be provided with a cock 39 for delivering the cooled liquid and with means 40 for its transportation. The container 37 can also be located on the bottom or on the walls of the bucket, and may have a cylindrical or annular shape.

The present invention has been described in certain preferred embodiments, being intended that it is not limited thereto. Thus, it will be possible to arrange two or more containers, containing two or more increments of frigorific mixture in order to ensure the continuous operation of the refrigerating unit. When the first charge of the mixture is depleted it will be possible to quickly replace it by the second charge. The salts contained in the depleted solution can also be recovered by evaporating the water.

According to the present invention, the container for the frigorific substance may be separate from the refrigerating unit and form an independent unit to be used in combination with any container to refrigerate.

The containers forming the portable refrigerating unit may be made from any material suitable to the purpose, such as metal, glass, plastic materials and the like; also, the thermal insulation means may consist of any bad heat-conductive material, such as expanded resins, cork, fabrics and the like.

I claim:

1. A portable refrigerating unit comprising in combination an outer cylindrical casing having a threaded neck and a wall of thermally insulating material, an inner container of a heat conductive material with a central threaded neck for containing products to be refrigerated, said inner container being positioned inside said cylindrical outer casing and having the wall thereof spaced from the wall of said outer casing to form an annular space between said outer casing and said inner container, spacing members in said annular space extending between said outer casing and said inner container, said inner container having the neck thereof protruding through said outer container and being rigidly tightly connected therewith, two caps threadedly engaging the necks of said outer casing and inner container respectively for assuring liquid-tight closure thereof, said cap on the neck of said inner container in the closed position abutting the top of said cap on the neck of said outer casing for hindering the independent opening of said last mentioned cap.

2. A portable refrigerating unit as claimed in claim 1, wherein said inner container has a longitudinal groove therein in alignment with the neck opening of said outer casing for increasing the width of said annular space and for facilitating the introduction of said refrigerating solution, said wall of said outer casing comprising a wall, a layer of thermally insulating material covering said wall and an outer coating wall over said layer of insulating material.

3. A portable refrigerating unit comprising in combination an outer cylindrical casing having a threaded neck and a wall of thermally insulating material, an inner container of a heat conductive material with a central threaded neck for containing products to be refrigerated, said inner container being positioned inside said cylindrical outer casing and having the wall thereof spaced from the wall of said outer casing to form an annular space between said outer casing and said inner container, a refrigerating solution contained in said annular space, spacing members in said annular space extending between said outer casing and said inner container, said inner container having the neck thereof protruding through said outer container and being rigidly tightly connected therewith, two caps threadedly engaging the necks of said outer casing and inner container respectively for assuring liquid-tight closure thereof, said cap on the neck of said inner container in the closed position abutting the top of said cap on the neck of said outer casing for hindering the independent opening of said last mentioned cap.

4. A portable refrigerating unit as claimed in claim 3, wherein said refrigerating solution is water and a mixture of ammonium nitrate, ammonium chloride, potassium nitrate and sodium sulphate.

5. A portable refrigerating unit as claimed in claim 3, wherein said refrigerating solution is 50 parts of water and a salt mixture of 30 to 40 parts of ammonium nitrate, 10 to 20 parts of ammonium chloride, 5 to 15 parts of potassium nitrate and 20 to 30 parts of sodium sulphate, the parts being parts by weight.

References Cited in the file of this patent

UNITED STATES PATENTS

| | | |
|---|---|---|
| 1,786,842 | Hannach | Dec. 30, 1930 |
| 1,841,776 | Aronson | Jan. 19, 1932 |
| 1,894,775 | Levenson | Jan. 17, 1933 |
| 2,013,946 | Bennett | Sept. 10, 1935 |
| 2,759,337 | Katz | Aug. 21, 1956 |
| 2,781,643 | Fairweather | Feb. 19, 1957 |
| 2,925,719 | Robbins et al. | Feb. 23, 1960 |